(12) United States Patent
Maeno et al.

(10) Patent No.: US 8,248,296 B2
(45) Date of Patent: Aug. 21, 2012

(54) METHOD AND PROGRAM FOR DISPLAYING RADAR IMAGE, AND TARGET OBJECT DETECTION SIGNAL PROCESSING DEVICE

(75) Inventors: Hitoshi Maeno, Nishinomiya (JP);
Youichi Maruyama, Nishinomiya (JP);
Kazuya Nakagawa, Nishinomiya (JP);
Koji Nishiyama, Nishinomiya (JP)

(73) Assignee: Furuno Electric Company Limited, Nishinomiya, Hyogo (JP)

( * ) Notice: Subject to any disclaimer, the term of this patent is extended or adjusted under 35 U.S.C. 154(b) by 4 days.

(21) Appl. No.: 12/916,737

(22) Filed: Nov. 1, 2010

(65) Prior Publication Data

US 2011/0102248 A1    May 5, 2011

(30) Foreign Application Priority Data

Nov. 2, 2009 (JP) ................................. 2009-251987

(51) Int. Cl.
*G01S 13/00* (2006.01)
(52) U.S. Cl. .......................................... 342/96; 342/179
(58) Field of Classification Search .................... 342/96, 342/179
See application file for complete search history.

(56) References Cited

U.S. PATENT DOCUMENTS

| 4,005,415 | A | * | 1/1977 | Kossiakoff et al. ............. 342/90 |
| 5,097,268 | A | * | 3/1992 | Bauer et al. .................... 342/160 |
| 6,311,108 | B1 | * | 10/2001 | Ammar et al. ................... 701/16 |
| 2006/0145914 | A1 | * | 7/2006 | Fujikawa et al. ............. 342/185 |
| 2008/0169974 | A1 | * | 7/2008 | Fujikawa et al. ............. 342/179 |

FOREIGN PATENT DOCUMENTS

| DE | 3924859 A1 | 1/1991 |
| EP | 1172664 A2 | 1/2002 |
| JP | 8-136641 A | 5/1996 |
| JP | 2002-139562 A | 5/2002 |
| JP | 2003-315439 A | 11/2003 |

* cited by examiner

*Primary Examiner* — Timothy A Brainard
(74) *Attorney, Agent, or Firm* — Birch, Stewart, Kolasch & Birch, LLP

(57) ABSTRACT

This disclosure provides a target object detection signal processing device, which includes a reception data output module, to which a reception signal is inputted, for outputting reception data indicative of a signal level of the reception data, a scan-to-scan correlation processing module for performing scan-to-scan correlation processing between the reception data and previous reception data indicative of a reception level of previously acquired reception signal to output scan-to-scan correlation data, and an output selection module, to which the reception data and the scan-to-scan correlation data are inputted, for selectively outputting either one of the data.

20 Claims, 5 Drawing Sheets

METHOD AND PROGRAM FOR DISPLAYING RADAR IMAGE, AND TARGET OBJECT DETECTION SIGNAL PROCESSING DEVICE

CROSS-REFERENCE TO RELATED APPLICATION(S)

The application claims priority under 35 U.S.C. §119 to Japanese Patent Application No. 2009-251987, which was filed on Nov. 2, 2009, the entire disclosure of which is hereby incorporated by reference.

TECHNICAL FIELD

The present invention relates mainly to a target object detection signal processing device, and, more specifically, to the target object detection signal processing device, which is used for target object detection, for suppressing an unnecessary signal contained in a signal received by a radar device, a scanning sonar or the like, and to a method and program for displaying a radar image.

BACKGROUND

Conventionally, in radar devices, suppressing a signal level of clutters (unnecessary signals) by performing CFAR (Constant False Alarm Rate) processing or scan-to-scan correlation processing is known.

Although an echo from a target object is detected so as to be comparatively stable with time, the signal level of clutters varies at random with time. For this reason, the clutters can be suppressed by performing the scan-to-scan correlation processing for suppressing the signal varying at random with time, leaving the echo from the target object. A radar device for performing the scan-to-scan correlation processing is disclosed in the following publications, for example.

JPA 2003-315439 discloses a configuration including a correlation processing memory that independently stores moving target objects, respectively, and for performing surface correlation processing for every correlation processing memory (scan-to-scan correlation processing). Therefore, this related art can accurately discriminate moving target objects while removing noises, such as sea surface reflections.

JPA H08-136641 discloses a configuration including a recursive digital filter, and for changing and setting a filter characteristic in real time according to a change in echo signal. Therefore, this related art can prevent a target object signal from being suppressed when suppressing a clutter signal.

However, JPA 2003-315439 must provide a memory for every moving target object. For this reason, if the scan-to-scan correlation processing is performed for many target objects, a required memory capacity will be enormous. In addition, there is a problem that a calculation load will also increase.

JPA H08-136641 also determines a rising edge or a trailing edge of the signal, and determines whether the signal is a target object or a clutter. Therefore, complicated processing in which a coefficient of the recursive digital filter is changed based on the determination result must be performed.

JPA 2002-139562 needs to track each moving target object in advance by ARPA (Automatic Collision Prevention Assistance Device) or the like before performing the scan-to-scan correlation processing.

Therefore, there is a problem that the configuration becomes complicated by any of the related arts described above. In addition, the scan-to-scan correlation processing disadvantageously suppresses the echo from the target object which moves at a high speed. For this reason, if the scan-to-scan correlation processing is performed, the echo of the high-speed moving target object is suppressed and, thus, this makes the detection of the high-speed moving target object difficult.

SUMMARY

The present invention is made in the view of situations described above, and provides a target object detection signal processing device that enables detection of a high-speed moving target object by a simpler configuration, while suppressing an unnecessary signal, as well as provides a method and a program for displaying a radar image.

According to an aspect of the invention, a target object detection signal processing device includes a reception data output module, to which a reception signal is inputted, for outputting reception data indicative of a signal level of the reception data, a scan-to-scan correlation processing module for performing scan-to-scan correlation processing between the reception data and previous reception data indicative of a reception level of previously acquired reception signal to output scan-to-scan correlation data, and an output selection module, to which the reception data and the scan-to-scan correlation data are inputted, for selectively outputting either one of the data.

The reception data output module acquires the reception data indicative of the signal level of the signal received by the antenna. For example, the device discharges from an antenna the electromagnetic wave generated in an electromagnetic wave generator, such as a magnetron, and propagated through a waveguide. The discharged electromagnetic wave is reflected on the target object, such as another ship or a land. The reflected echo signal is received by the antenna, and based on a received timing, an azimuth direction, and a signal level of the echo signal, an azimuth direction and a distance of the target object can be detected. The scan-to-scan correlation processing module outputs the scan-to-scan correlation data obtained by performing the scan-to-scan correlation processing to the reception data. The output selection module outputs the reception data if the signal level of the reception data is greater than a predetermined threshold. On the other hand, if the signal level of the reception data is less than the threshold, the scan-to-scan correlation data is selectively outputted.

The reception signal may be an echo signal from a target object received by an antenna.

The scan-to-scan correlation processing module may perform the scan-to-scan correlation processing between the reception data and the scan-to-scan correlation data generated based on the previously acquired reception signal, and may output new scan-to-scan correlation data.

The target object detection signal processing device may further include a threshold setting module for setting a selection threshold based on the reception data, and outputting it to the output selection module. The output selection module may select between the reception data and the scan-to-scan correlation data based on the selection threshold.

The output selection module may output the reception data when the signal level of the reception signal is above a predetermined value, and may selectively output the new scan-to-scan correlation data when the signal level of the reception data is less than the predetermined value.

The threshold setting module may set the selection threshold to a greater value than a signal level resulting from a clutter component contained in the reception signal.

The output selection module may change the selection threshold based on the signal level of the reception data.

The scan-to-scan correlation processing module may include a low-pass filter that selectively passes a low frequency component with respect to the reception data corresponding to the echo signal from the target object.

The scan-to-scan correlation processing module may include a recursive digital filter for calculating:

$$Y_{r,\theta}(n) = \alpha X_{r,\theta}(n) + (1-\alpha) Y_{r,\theta}(n-1),$$

here, $Y_{r,\theta}(n)$ is the scan-to-scan correlation data, $X_{r,\theta}(n)$ is the latest reception data, and $Y_{r,\theta}(n-1)$ is the scan-to-scan correlation data of one scan before, and a coefficient $\alpha$ is ranging $0 \leq \alpha \leq 1$.

The target object detection signal processing device may further include a sweep memory for storing the scan-to-scan correlation data.

The scan-to-scan correlation processing module may include a memory for storing the scan-to-scan correlation data of one scan before so as to be associated with an azimuth direction and a distance. The scan-to-scan correlation processing module may read the new reception data from the sweep memory, may read the scan-to-scan correlation data associated with the azimuth direction and the distance of the new reception data from the memory, and may perform the scan-to-scan correlation processing between the new reception data and the scan-to-scan correlation data to output the new scan-to-scan correlation data.

The target object detection signal processing device may further include a binarizing module for binarizing the data outputted from the output selection module based on a predetermined binarizing threshold.

The binarizing threshold may be less than the selection threshold.

The binarizing module may output a signal indicative of existence of the target object when the output from the output selection module is greater than the binarizing threshold.

The target object detection signal processing device may further include a tracking module for tracking the target object based on the output from the binarizing module.

The target object detection signal processing device may further include an echo trail generation processing module for performing echo trail generation processing to indicate a trail of the target object based on the data outputted from the output selection module.

The target object detection signal processing device may further includes an antenna for transmitting an electromagnetic wave, receiving an echo signal from the target object, and outputting a reception signal, and an image display module for displaying a radar image generated based on the data outputted from the output selection module.

The target object detection signal processing device may further include a binarizing module for binarizing the data outputted from the output selection module based on a predetermined binarizing threshold to indicate existence of the target object, and a tracking module for tracking the target object based on the output from the binarizing module.

According to another aspect of the invention, a radar image display program readable by a computer is provided, which includes causing a computer to transmit an electromagnetic wave by an antenna and receive an echo signal, causing a computer to perform scan-to-scan correlation processing between reception data indicative of a reception level of the echo signal and previous reception data indicative of a reception level of previously acquired echo signal to output scan-to-scan correlation data, causing a computer to be inputted the reception data and the scan-to-scan correlation data, and selectively output either one of the reception data and the scan-to-scan correlation data based on a predetermined selection threshold, and causing a computer to output image data for displaying a radar image based on the selectively outputted data.

Therefore, a similar function to the target object detection signal processing device described above can be attained as a computer readable program, which typically stored in a data storage medium.

According to another aspect of the invention, a method of displaying a radar image is provided, which includes transmitting an electromagnetic wave by an antenna and receiving an echo signal, performing scan-to-scan correlation processing between reception data indicative of a reception level of the echo signal and previous reception data indicative of a reception level of the previously acquired echo signal to output scan-to-scan correlation data, setting a selection threshold based on the reception data. The method also includes, in response to an input of the reception data and the scan-to-scan correlation data, selectively outputting either one of the reception data and the scan-to-scan correlation data based on the selection threshold, and displaying a radar image generated based on the selectively outputted data.

Therefor, a similar function to the target object detection signal processing device described above can be attained, and the radar image can be created based on the selectively outputted data.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

With reference to the appended drawings, several embodiments of a target object detection signal processing device and a radar device, as well as a program and a method therefor according to the present invention are described.

First Embodiment

Figure 1:
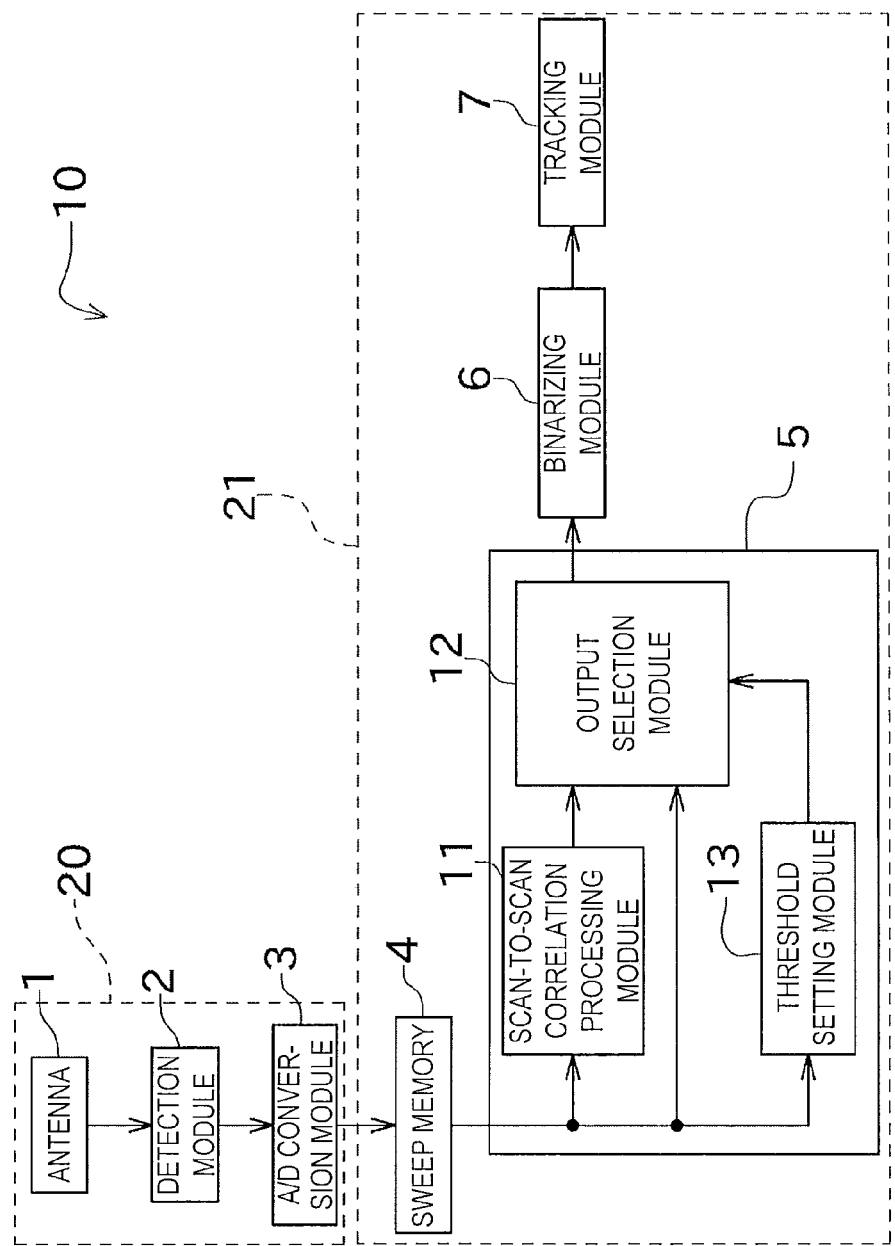
FIG. 1 is a block diagram of a radar device according to a first embodiment of the present invention.

FIG. 1 is a block diagram of a radar device 10 according to an embodiment of the present invention. The radar device 10 of this embodiment is a ship radar equipped on a ship, such as a fishing boat, a merchant ship or the like, and is mainly used for detection of a target object, such as another ship. A target object detection signal processing device according to the invention can be applied widely to the radar device for detecting the target object by an electromagnetic wave, or to a scanning sonar for detecting the same by an ultrasonic wave. Here, in this embodiment, the radar device is described as an example.

As shown in FIG. 1, the radar device 10 of this embodiment includes an antenna unit 20 and a signal processing module 21. The antenna unit 20 includes an antenna 1, a detection module 2, and an A/D conversion module 3 (reception data output module). The signal processing module 21 may be configured independently, or may be incorporated into the radar device as a part thereof.

The signal processing module 21 includes a sweep memory 4, a clutter suppressing module 5, and a binarizing module 6, and a tracking module 7. The clutter suppressing module 5 includes a scan-to-scan correlation processing module 11, an output selection module 12, and a threshold setting module 13. A part of the output from the sweep memory 4 is applied with scan-to-scan correlation processing by the scan-to-scan correlation processing module 11, and the resultant is inputted into the output selection module 12. Other part of the input is fundamentally inputted into the output selection module 12 as it is. Some other part of the output from the sweep memory 4 is inputted into the threshold setting module 13 to set a threshold.

Based on the threshold, the output selection module 12 selects data between the scan-to-scan correlation processing module 11 and data directly from the sweep memory 4, and outputs them to the binarizing module 6. The binarizing module 6 performs binarizing processing where the data outputted from the output selection module 5 is binarized into "1" or "0" by a predetermined binarizing threshold.

Figure 2:
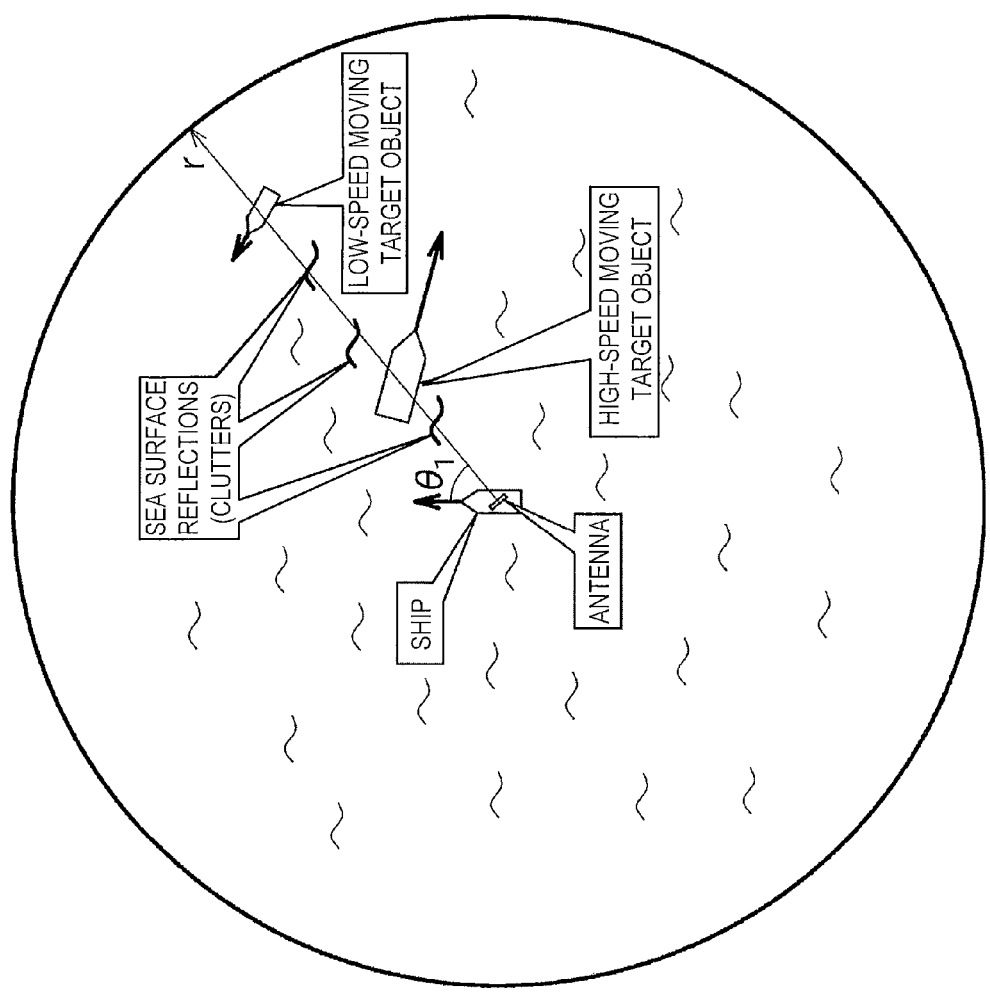
FIG. 2 is a schematic view illustrating a situation around a ship concerned.

The antenna 1 transmits a pulse-shaped electromagnetic wave of a strong directivity, and receives an echo (reflection wave) from the target object. As shown in FIG. 2, a distance "r" to the target object can be detected by measuring a time length from the transmission of the pulse-shaped electromagnetic wave to the reception of the echo signal. The antenna 1 rotates 360° in a horizontal plane, and repeats the transmission and reception of the electromagnetic wave while changing a transmitting azimuth direction of the pulse-shaped electromagnetic wave (changing an antenna angle θ). With the above configuration, the target object in a plane around the ship concerned is detected, checking all the azimuth directions (360°).

Thus, a signal level of the reception signal can be detected so as to correspond to the azimuth direction and the distance from the antenna 1. Alternatively, existence of the target object may also be known so as to correspond to the azimuth direction and the distance from the antenna 1 based on the output from the binarizing module 6.

In the following description, an operation from a transmission of a pulse-shaped electromagnetic wave to another transmission of a subsequent pulse-shaped electromagnetic wave is referred to as a "sweep." Further, an operation for rotating the antenna for 360° while transmitting and receiving the electromagnetic wave is referred to as a "scan."

In the above signal processing module, the scan-to-scan correlation processing fundamentally takes a correlation between reception data acquired with a scan at a certain time and reception data acquired with a scan at a time before the reception data or scan-to-scan correlation data that has already been generated.

Usually, when the correlation between both the data is analyzed and there is a predetermined level or more in both the data, it is determined with a high possibility that the target object exists at a corresponding position. On the other hand, as for the reception data of which a signal level varies at random with time, the signal level is suppressed by the scan-to-scan correlation processing. That is, if the predetermined level or more is not detected in both the data, or if the predetermined level or more is detected in either data, it is determined with a high possibility that the data is based on a sea clutter or the like. In this case, the data is removed from a radar image indication as an unnecessary signal. Thereby, a noise, a clutter and the like can be suppressed.

Preferably, the scan-to-scan correlation processing module 11 of the signal processing module 21 includes a scan-to-scan correlation memory (not illustrated) for storing the scan-to-scan correlation data already generated by the scan-to-scan correlation processing. The scan-to-scan correlation processing module 11 obtains new scan-to-scan correlation data based on reception data currently acquired from the antenna 1, and reception data acquired previously or the already generated scan-to-scan correlation data. Thereby, the scan-to-scan correlation processing can be performed appropriately.

The detection module 2 detects and amplifies the signal received by the antenna 1, and outputs a reception signal to the A/D conversion module 3. The A/D conversion module 3 samples the reception signal of an analog form, and converts it into digital data (reception data) having two or more bits. A value of the reception data indicates an intensity of the signal (signal level) received by the antenna 1. The A/D conversion module 3 outputs the reception data to the sweep memory 4.

As the sweep memory 4, a buffer memory that can store the reception data in real time for one sweep is used. The sweep memory 4 acquires the reception data from the antenna unit 20.

The sweep memory 4 sequentially stores the reception data sampled during one sweep from a beginning address. For this reason, the distance r to an echo source, which corresponds to the reception data, can be found based on the read-out address when reading the reception data from the sweep memory 4.

From the antenna 1, data indicative of a current azimuth direction of the antenna 1 (antenna angle θ) is outputted (illustration is omitted). With the above configuration, when reading the reception data from the sweep memory 4, a position of the echo source corresponding to the reception data can be acquired by polar coordinates (r,θ).

Specifically, a case where a situation around the ship concerned is like FIG. 2 is assumed and described below.

It is assumed that there are another ship which moves at a high speed located at a short distance (high-speed moving target object), and a ship which moves at a low speed located at a long distance (low-speed moving target object), around the ship concerned that equips the radar device. Both the target objects are detected by the electromagnetic wave discharged from the radar device. On the other hand, sea clutters around the ship concerned are also detected by the radar device. The term "clutter" as used herein means a reflection wave that is unnecessary to detect the target object, such as a reflection wave from a sea surface, a reflection wave from rain or the like.

Figure 3:
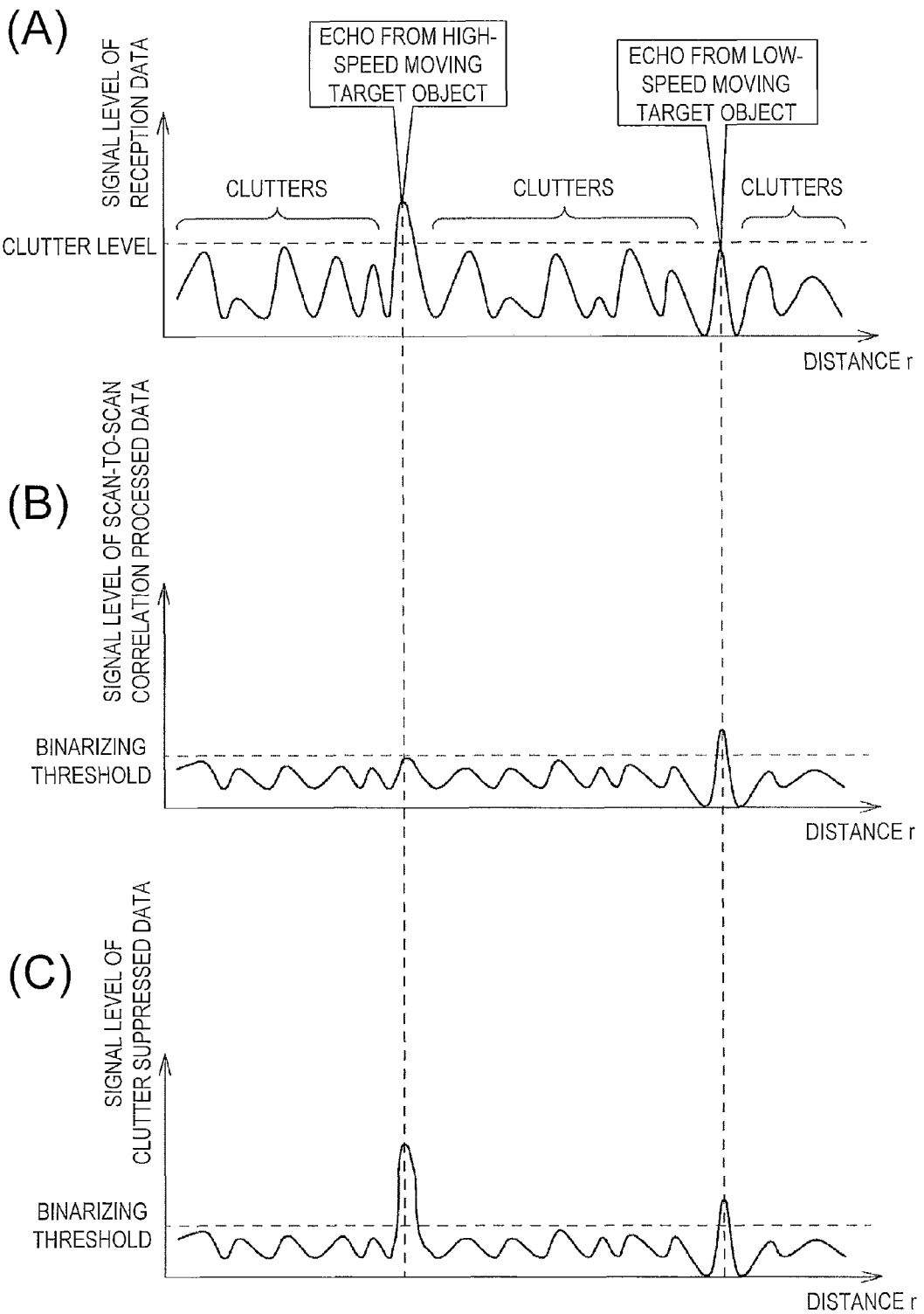
FIG. 3 is graphs showing reception data, scan-to-scan correlation data, and clutter suppressed data, respectively.

In FIG. 3, (A) illustrates a graph of the reception data, (B) illustrates a graph of the scan-to-scan correlation data, and (C) illustrates a graph of clutter suppressed data.

In the situation of FIG. 2, a series of reception data read from the sweep memory 4 when the antenna angle is $\theta_1$ (see FIG. 2) will be shown as the graph (A) of FIG. 3. The vertical axis of the graph corresponds to the signal level of the reception data, and the horizontal axis corresponds to the read-out address (that is, corresponds to the distance r from the ship concerned to the echo source) from the sweep memory. In the graph (A) of FIG. 3, the reception data is illustrated as a continuous analog waveform. However, the illustration is merely conceptual, and, in fact, the reception data read from the sweep memory 4 is discrete digital data.

In the example of the graph (A) of FIG. 3, the echo from the high-speed moving target object and the echo from the low-speed moving target object appear as peaks of the signal level.

Although small peaks other than the echoes from the target objects are also detected as shown in the waveform of the graph (A) of FIG. 3, these small peaks are signals unnecessary to display a radar image, such as the clutters and noises.

In FIG. 3, the graph (B) shows a signal obtained by carrying out the scan-to-scan correlation processing to the reception signal shown in the graph (A). As shown in this graph, when the scan-to-scan correlation processing is performed, the echo from the high-speed moving target object will be suppressed.

This originates in that the echo from the target object which moves at a high speed varies in its position every moment apparently, and the echo from this target object is detected at a different position for every scan. That is, the signal appears to be unstable. For this reason, if the scan-to-scan correlation processing is performed to the target object which moves at a high speed, the echo of the high-speed moving target object will be suppressed and the signal of the high-speed moving target object will be erased. As a result, the detection of the target object which moves at a high speed becomes difficult. Therefore, if this goes on, the target object which moves at a high speed cannot be detected based on the scan-to-scan correlation processed data in the binarizing module 6.

Meanwhile, a ship which can travel at a high speed in the sea where strong sea clutters are generated (stormy weather sea) is a comparatively large-sized ship with a large RCS (Radar Cross-section). Generally, the signal level of the echo from this kind of ship is strong compared with the clutter level. Conversely, even if the clutters are strong, a large majority of target objects which moves at a high speed in this clutters can be distinguished from the clutters without performing the scan-to-scan correlation processing.

If it is not the stormy weather, a comparatively small ship with a small RCS can travel at a high speed. In this case, because the level of the sea clutters is low, the echo indicative of the ship and the clutters are easily distinguishable from each other as well. That is, generally, the signal level of the echo from the ship which travels at a high speed is higher than the clutter level. Thus, a great portion of the target objects which move at a high speed can be detected without performing the scan-to-scan correlation processing. Therefore, the present invention utilizes this principle.

In FIG. 3, the graph (C) shows a result (clutter suppressed data) obtained by processing the reception signal shown in the graph (A) by the clutter suppressing module. The vertical axis of the graph (C) of FIG. 3 is a signal level of the clutter suppressed data. As shown in the graph (C) of FIG. 3, the clutter suppressing module 5 of this embodiment can suppress only the signal level of the clutters, while maintaining the signal level of the data indicative of the echoes of the target objects.

Returning to FIG. 1, when the clutter suppressing module 5 reads the reception data from the sweep memory 4, it performs processing for suppressing the clutters to the reception data. The detailed configuration and operation of the clutter suppressing module 5 are described later. The data which is obtained by suppressing the clutters from the reception data by the clutter suppressing module (clutter suppressed data) is outputted to the binarizing module 6.

The binarizing module 6 performs binarizing by comparing the signal level of the clutter suppressed data with a predetermined binarizing threshold. Specifically, if the signal level of the clutter suppressed data is greater than the binarizing threshold, the binarizing module 6 outputs data indicating that the "target object exists" (for example, "1"). On the other hand, if the signal level of the clutter suppressed data is less than the binarizing threshold, it output data indicating that the "target object does not exist" (for example, "0").

A selection threshold for selecting between the reception data and the scan-to-scan correlation data by the output selection module 5 is set in order to determine whether the target object is contained in the reception data. On the other hand, the binarizing threshold is typically set less than the selection threshold because it is necessary to be used for distinguishing the existence of the target object for the scan-to-scan correlation processed data.

Here, the signal processing module 21 is preferred to be configured as follows. The signal processing module 21 obtains an unnecessary signal level of the reception data based on the reception data. The selection threshold is determined based on the unnecessary signal level obtained by the signal processing module. The selection threshold is set corresponding to an overall level variation of the unnecessary signal due to a weather condition that affects to the sea clutters, such as a rainstorm. Thereby, because the selection threshold can be determined appropriately, even if the level variation is generated due to an external factor, the target object detection and the unnecessary signal suppression can be performed appropriately.

Preferably, the signal processing module 21 is configured as follows. The signal processing module 21 includes a tracking module for tracking the target object based on the data outputted from the output selection module. Thereby, the target object including the high-speed moving target object can be certainly tracked. In this embodiment, a configuration where the tracking module 7 is provided is illustrated. The processed result by the binarizing module 6 described above (binarized data) is outputted to the tracking module 7.

When the binarized data is inputted, the tracking module 7 tracks each target object by sequentially acquiring a position of a corresponding target object echo. The tracking is described briefly as follows.

That is, the tracking module 7 evaluates a continuity in a plane of the binarized data inputted from the binarizing module 6. Next, the tracking module 7 extracts spatially-collective data which is determined to be the "target object exists," and acquires coordinates of a representative point. It would appear that the spatially-collective data indicates the echo from a single target object. The coordinates of the representative point indicate the position of the target object.

The tracking module 7 tracks by inputting the coordinates of the representative point into a tracking filter. As the tracking filter, an α-β filter, a Kalman filter or the like may be used. By the above processing, the tracking module 7 can acquire information including a position, a moving direction, a moving speed and the like of each target object.

Figure 4:
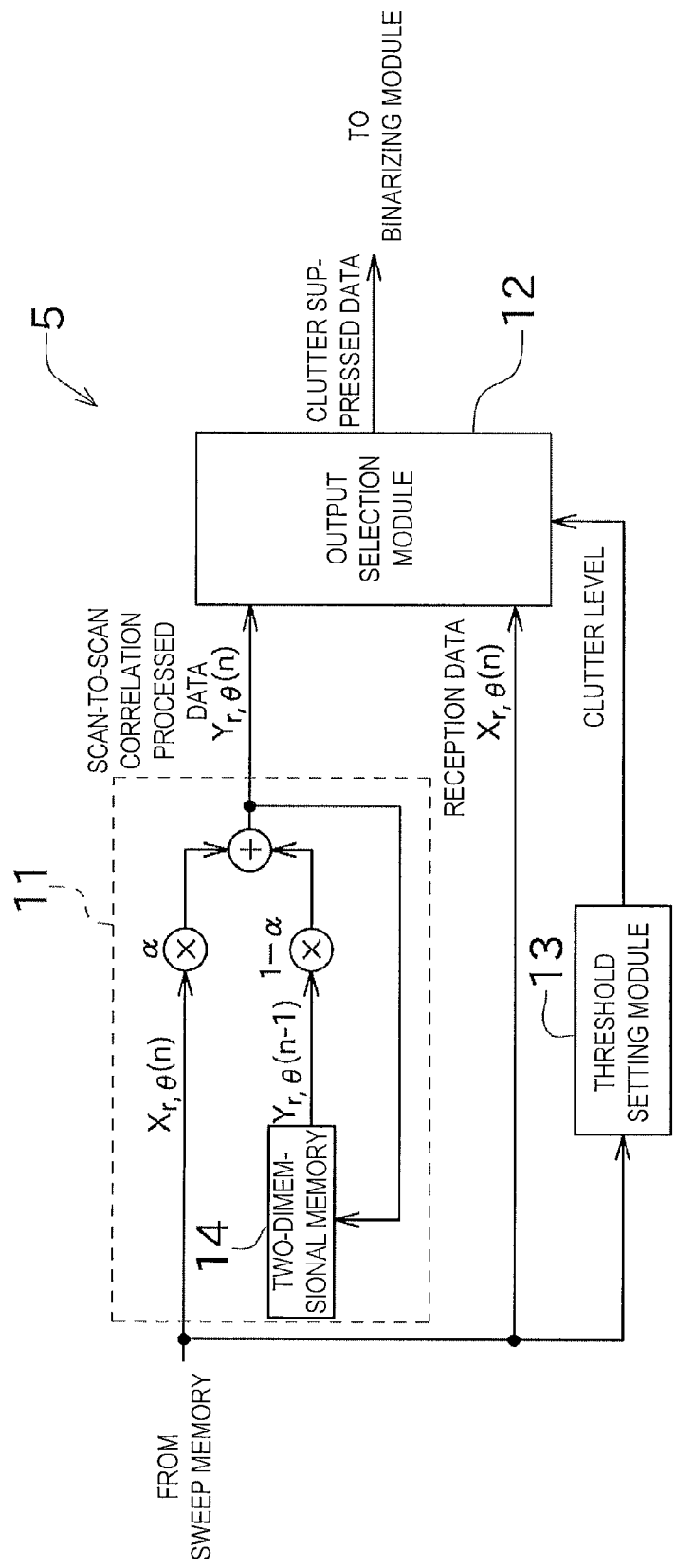
FIG. 4 is a block diagram of a clutter suppressing module.

Next, with reference to FIG. 4, a configuration of the clutter suppressing module 5 is described in detail.

The clutter suppressing module 5 includes hardware having a CPU, a RAM, a ROM, and the like (not illustrated), and a signal processing program stored in the ROM.

The signal processing program implements a signal processing method of this embodiment using the hardware which the clutter suppressing module 5 equips. Specifically, this signal processing program includes a scan-to-scan correlation processing step, an output selection step, and a clutter level setting step.

By execution of the signal processing program, the clutter suppressing module 5 can function as the scan-to-scan correlation processing module 11, the output selection module 12, and threshold setting module 13, described above. Hereinafter, the method is described in detail, also referring to FIG. 1.

The scan-to-scan correlation processing module 11 performs, as the scan-to-scan correlation processing, processing where a correlation between first reception data and second reception data acquired by the past scan before the first reception data (previously acquired reception data) is taken. By this configuration, the reception data, of which the signal level varies at random with time, is suppressed in signal level by the scan-to-scan correlation processing. Thereby, a noise, a clutter and the like can be suppressed.

The scan-to-scan correlation processing module 11 further includes a two-dimensional memory 14 for storing past scan-to-scan correlation data, and obtains scan-to-scan correlation data based on the reception data and the past scan-to-scan correlation data. Thereby, the suppressing of a noise, a clutter and the like by the scan-to-scan correlation processing can be performed more appropriately.

The reception data from the sweep memory 4 is inputted into the scan-to-scan correlation processing module 11. The scan-to-scan correlation processing module 11 performs processing for suppressing the clutters contained in the reception data based on the past data and the latest reception data (scan-to-scan correlation processing). The function of the scan-to-scan correlation processing module 11 corresponds to the scan-to-scan correlation processing step of the signal processing program.

The echo signal from the target object is a signal which is temporally-stably detected, and the clutter is a signal which varies at random with time. The term "temporally stable" as used herein means that the signal level between the scans is stable. If the echoes of a similar signal level is stably detected from a position of the antenna angle θ and the distance r for two or more scans, it can be said that the signal from the position (r,θ) is stable with time.

By applying low-pass digital filter processing to the reception data corresponding to the echo from the certain position (r,θ), the signal varying at random (unnecessary signal, such as the clutter) can be suppressed, leaving the signal detected stably with time at the position (r,θ) (echo from the target object or the like). As an implementation of the low-pass filter, recursive digital filter processing expressed by the following equation is applied to the reception data to suppress the clutters.

$$Y_{r,\theta}(n)=\alpha X_{r,\theta}(n)+(1-\alpha)Y_{r,\theta}(n-1) \quad (1)$$

The above is the scan-to-scan correlation processing according to this embodiment. Here, $Y_{r,\theta}(n)$ is the scan-to-scan correlation data, $X_{r,\theta}(n)$ is the latest reception data, $Y_{r,\theta}(n-1)$ is the scan-to-scan correlation data of one scan before. A range of a coefficient α is ($0 \leq \alpha \leq 1$).

A configuration of the scan-to-scan correlation processing module 11 for implementing the scan-to-scan correlation processing described above is particularly described with reference to FIG. 4.

As shown in FIG. 4, the scan-to-scan correlation processing module 11 includes the two-dimensional memory 14. The two-dimensional memory 14 stores the scan-to-scan correlation data of one scan before ($Y_{r,\theta}(n-1)$, described above) for one rotation of the antenna (that is, for one scan).

When the scan-to-scan correlation processing module 11 reads the new reception data $X_{r,\theta}(n)$ from the sweep memory 4, it reads the scan-to-scan correlation data $Y_{r,\theta}(n-1)$ (of one scan before) corresponding to the new reception data $X_{r,\theta}(n)$ from the two-dimensional memory 14. The scan-to-scan correlation processing module 11 obtains the new scan-to-scan correlation data $Y_{r,\theta}(n)$ by calculating Equation (1) described above. Finally, the scan-to-scan correlation processing module 11 updates the scan-to-scan correlation data $Y_{r,\theta}(n-1)$ of one scan before stored in the two-dimensional memory 14 with the new scan-to-scan correlation data $Y_{r,\theta}(n)$.

The above scan-to-scan correlation processing is thus performed for the reception data shown in the graph (A) of FIG. 3, and the result (scan-to-scan correlation data) is shown in the graph (B) of FIG. 3. As shown in the graph (B) of FIG. 3, the clutters can be suppressed by the scan-to-scan correlation processing, while maintaining the signal level of the echo from the low-speed moving target object. Thereby, the binarizing module 6 can detect the low-speed moving target object.

The conventional radar device does not perform the scan-to-scan correlation processing as preprocessing of the binarizing processing. For this reason, if the echo from the target object is buried in the clutters, the echo cannot be detected by the binarizing processing. Therefore, in this conventional radar device, when the clutters are strong, an accurate tracking of the target object cannot be performed.

On the other hand, in this embodiment, the binarizing processing is performed after suppressing the clutters by the scan-to-scan correlation processing as described above. Thereby, even if the target object echo is buried in the clutters, it can be detected by the binarizing module 6. As a result, an accurate tracking can be performed by the tracking module 7.

From the aspect described above, the clutter suppressing module 5 of the radar device 10 of this embodiment may also have a function as the output selection module 12 and the threshold setting module 13.

Next, the function of the threshold setting module 13 is described again referring to FIG. 1.

The reception data from the sweep memory 4 is inputted into the threshold setting module 13. Based on the reception data, the threshold setting module 13 obtains a current clutter level (clutter intensity), and outputs it to the output selection module 12. The function of the threshold setting module 13 corresponds to the clutter level setting step of the signal processing program.

The reception data from the sweep memory 4 and the scan-to-scan correlation data from the scan-to-scan correlation processing module 11 are inputted into the output selection module 12. The output selection module 12 selects either one of the reception data and the scan-to-scan correlation data based on the signal level of the reception data. The selected data is outputted as the clutter suppressed data. The function of the output selection module 12 corresponds to the output selection step of the signal processing program.

This function is more specifically as follows. First, the output selection module 12 determines in advance a selection threshold having a value greater than the clutter level set by the threshold setting module 13. When the reception data is inputted from the sweep memory 4, the output selection module 12 compares a signal level of the reception data with the selection threshold.

If the signal level of the reception data is greater than the selection threshold, because the signal level of the reception data is well greater than the clutter level, it can be determined certainly that the reception data indicates the echo from the target object (not being the clutter). In this case, the output selection module 12 outputs the reception data from the sweep memory 4 (reception data which is not scan-to-scan correlation processed) to the binarizing module 6 as it is.

On the other hand, if the signal level of the reception data is less than the selection threshold, it cannot be determined certainly whether the reception data indicates the echo from the target object or the clutter. This is because the echo from the target object may be buried in the clutters. In such a case, the scan-to-scan correlation data, which is scan-to-scan correlation processed, is necessary to the detect target object by the binarizing module. The output selection module 12 outputs the scan-to-scan correlation data to the binarizing module 6.

The data outputted from the clutter suppressing module 5 (clutter suppressed data) configured as described above will be as shown in the graph (C) of FIG. 3, for example. For the output from the scan-to-scan correlation processing module 11 (scan-to-scan correlation data), data where the reception data having the signal level greater than the selection threshold (data which is not scan-to-scan correlation processed) is embedded is outputted from the clutter suppressing module 5.

As described above, the signal level of the echo from the ship which moves at a high speed is generally greater than the clutter level. Therefore, for a great portion of the high-speed moving target objects, the reception data where the signal level is not suppressed (reception data which is not scan-to-scan correlation processed) can be outputted from the clutter suppressing module 5. Thereby, as shown in the graph (C) of FIG. 3, the signal from which only the clutters are suppressed can be obtained with neither of the echo from the high-speed moving target object or the echo from the low-speed moving target object being suppressed. Therefore, even if the target object is the high-speed moving target object, it can be appropriately determined in the latter stage of the binarizing module 6 that the "target object exists."

As described above, the radar device 10 of this embodiment includes the antenna 1, and the signal processing module 21 including the sweep memory 4, the scan-to-scan correlation processing module 11, and the output selection module 12. If the signal level of the reception data is greater than the predetermined selection threshold, the output selection module 12 outputs the reception data, and if the signal level of the reception data is less than the selection threshold, the output selection module 12 selectively outputs the scan-to-scan correlation data.

By the configuration described above, if the signal level of the echo from the target object is large enough (if the echo from the target object is not buried in the unnecessary signals), the reception data which is not scan-to-scan correlation processed can be outputted. Generally, the echo signal level from the ship which can travel at a high speed is higher than the clutter level. For the echo from the high-speed moving target object, the reception data of which the signal level is not suppressed by the scan-to-scan correlation processing can be outputted. Therefore, only the unnecessary signals can be suppressed by the scan-to-scan correlation processing, while preventing the signal level of the echo from a great portion of the high-speed moving target objects from being suppressed by the scan-to-scan correlation processing.

The signal processing module 21 of this embodiment includes the threshold setting module 13 for obtaining the clutter level of the reception data based on the reception data. The selection threshold is determined based on the clutter level obtained by the threshold setting module 13. Thereby, the selection threshold can be determined appropriately. Therefore, even if the clutter level varies according to the weather condition or the like, the detection of the target object and the suppression of the clutters can be performed appropriately.

The signal processing module 21 of this embodiment includes the tracking module 7 for tracking the target object based on the data outputted from the output selection module 12. Thereby, the target object including the high-speed moving target object can be tracked certainly.

Second Embodiment

Next, a second embodiment of the present invention is described with reference to FIG. 5.

Figure 5:
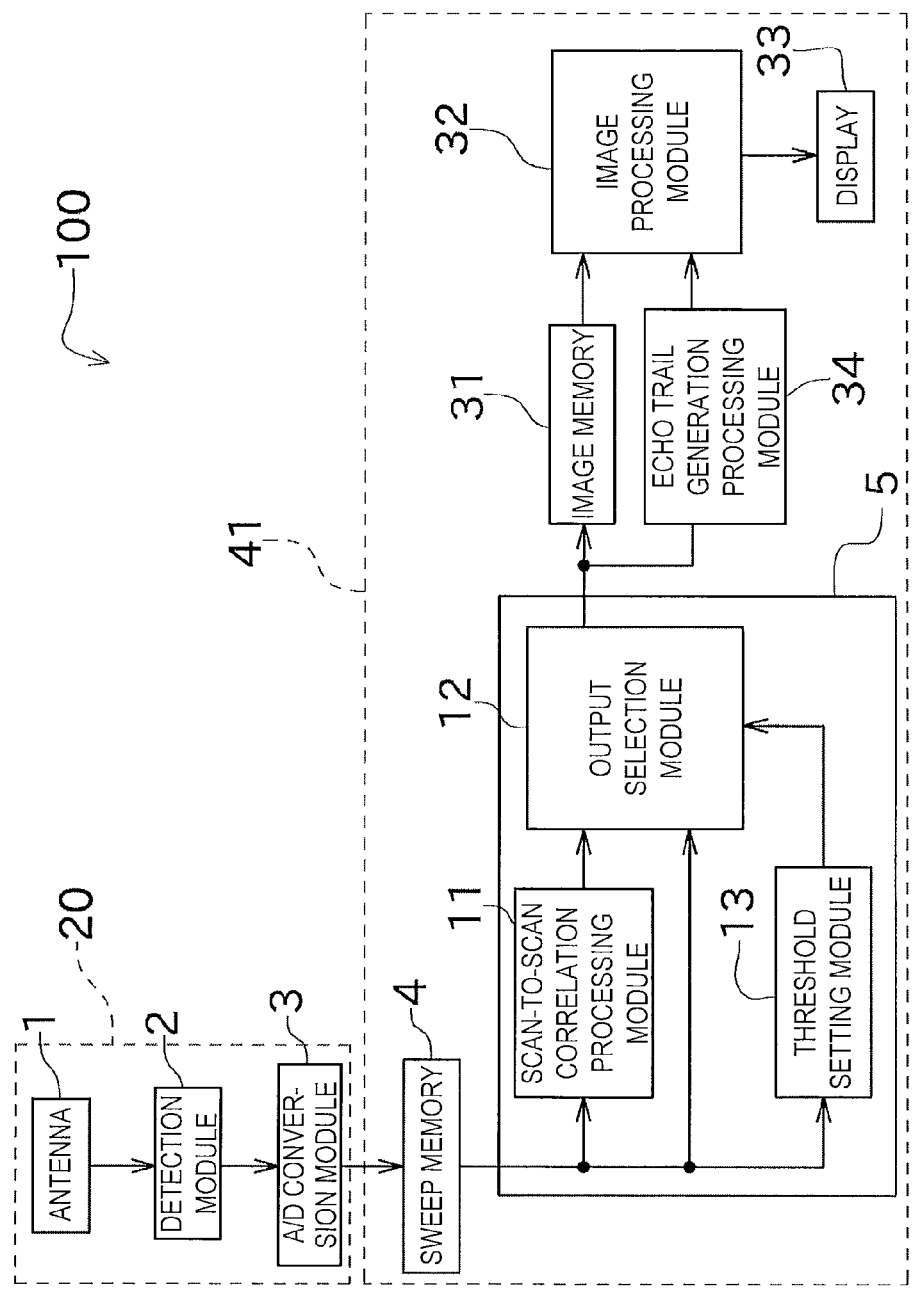
FIG. 5 is a block diagram of a radar device according to a second embodiment of the present invention.

FIG. 5 is a block diagram of a radar device 100 according to this embodiment, illustrated as an example of the (radar) signal processing device according to the invention. In the following description, configurations of this embodiment the same as and similar to those of the first embodiment described above are denoted with the same numerals, and description thereof is thus omitted.

Preferably, the radar signal processing device of this embodiment includes an echo trail generation processing module for performing echo trail generation processing based on the data outputted from the output selection module. Thereby, it can leave trails to both the high-speed moving target object and the low-speed moving target object.

In a signal processing module 41 provided to the radar device 100 of this embodiment, clutter suppressed data from the clutter suppressing module 5 is outputted to the image memory 31. The image memory 31 stores a two-dimensional raster image. When outputting the clutter suppressed data to the image memory 31, it is outputted after an address indicative of a position in a plane of the echo indicated by the clutter suppressed data is specified. Thereby, the clutter suppressed data is plotted on a two-dimensional image, and, as a result, a raster radar image indicating a situation of target objects around the ship concerned can be generated.

The image memory 31 is connected with a display 33 via an image processing module 32. The display 33 is configured as a raster-scan color display device, and can display the radar image stored in the image memory 31.

The display indicates each pixel of the radar image as the two-dimensional image by a color corresponding to a signal level of the clutter suppressed data. For example, the clutter suppressed data with a high signal level is indicated by a darker color, and the clutter suppressed data with a low signal level is indicated in a lighter color, thereby the situation of target objects around the ship concerned is displayed. In this embodiment, because the radar image is generated based on the clutter suppressed data, both the echo of the high-speed moving target object and the echo of the low-speed moving target object can be displayed, while suppressing the clutters being displayed on the radar image.

The clutter suppressed data from the clutter suppressing module 5 is also inputted into an echo trail generation processing module 34. The echo trail generation processing module 34 generates a trail image indicative of a trail of each target object. The trail is generated as an image which leaves an "afterimage" at a position through which the echo passed to indicate the trail of the echo. This trail image is outputted to an image processing module 32.

In the conventional radar device, if the trail is generated based on the reception data containing the clutters, afterimages of the clutters will cover the trail image. For this reason, this will cause a problem that the trail of the echo indicative of the target object becomes difficult to be checked. On the other hand, if the scan-to-scan correlation processing is performed in order to suppress the clutters, the echo of the high-speed moving target object will also be suppressed. Therefore, when the trail is generated based on the scan-to-scan correlation data, this causes a problem that the trail is not generated for the high-speed moving target object.

In this regard, according to the configuration of this embodiment, the trails can also be generated for the low-speed moving target object and the high-speed moving target object, while suppressing the clutters.

The image processing module 32 superimposes the above-described radar image over the trail image, and outputs it to a display 33. Thereby, the radar image where the trail is indicated can be displayed on the display 33. An operator of the radar device can set the moving direction and the moving speed of the target object to some extent by checking the trail displayed in the radar image.

As described above, the signal processing module 41 of this embodiment includes the echo trail generation processing module 34 for performing the echo trail generation processing based on the data outputted by the output selection module 12. Thereby, the trails can be left to both the high-speed moving target object and the low-speed moving target object.

Although only several embodiments of the present invention are described above, each embodiment may be modified as follows.

The embodiment may be applied to a radar device for other applications other than the ship radar described above. Further, it may also be applied to a scanning sonar as well as to the radar device, for example.

In the above embodiment, the clutter suppressing modules 5 is described to include the hardware having the CPU, RAM, ROM and the like, and the software having a signal processing program stored in the ROM. However, alternatively, all or part of the scan-to-scan correlation processing modules 11, the output selection modules 12, and the threshold setting module 13 may be implemented by hardware for exclusive use.

As the determination method of the selection threshold, an arbitrary method can be used. For example, instead of the configuration where the selection threshold is determined based on the actual reception data as described above, a method of using a value obtained by adding a predetermined offset to a theoretical value of the unnecessary signal level as the selection threshold may be adopted.

In the above embodiment, the binarized data is inputted into the tracking filter. However, the binarizing processing may be omitted, and a multi-value image may be inputted into the tracking filter instead.

The scan-to-scan correlation processing may also be implemented using, for example, a FIR filter, other than the recursive digital filter described above.

The output from the clutter suppressing module of the first embodiment is used for the tracking, and the output from the clutter suppressing module of the second embodiment is used for the indication on the display. However, the output data of the clutter suppressing module may be used for other various purposes, without limitation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A target object detection signal processing device, comprising:
   a reception data output module, to which a reception signal is inputted, for outputting reception data indicative of a signal level of the reception data;
   a scan-to-scan correlation processing module for performing scan-to-scan correlation processing between the reception data and previous reception data indicative of a reception level of previously acquired reception signal to output scan-to-scan correlation data; and
   an output selection module, to which the reception data and the scan-to-scan correlation data are inputted, for selectively outputting either one of the data.

2. The target object detection signal processing device of claim 1, wherein the reception signal is an echo signal from a target object received by an antenna.

3. The target object detection signal processing device of claim 2, wherein the scan-to-scan correlation processing module performs the scan-to-scan correlation processing between the reception data and the scan-to-scan correlation data generated based on the previously acquired reception signal, and outputs new scan-to-scan correlation data.

4. The target object detection signal processing device of claim 3, further comprising a threshold setting module for setting a selection threshold based on the reception data, and outputting it to the output selection module;
   wherein the output selection module selects between the reception data and the scan-to-scan correlation data based on the selection threshold.

5. The target object detection signal processing device of claim 4, wherein the output selection module outputs the reception data when the signal level of the reception signal is above a predetermined value, and selectively outputs the new scan-to-scan correlation data when the signal level of the reception data is less than the predetermined value.

6. The target object detection signal processing device of claim 5, wherein the threshold setting module sets the selection threshold to a greater value than a signal level resulting from a clutter component contained in the reception signal.

7. The target object detection signal processing device of claim 6, wherein the output selection module changes the selection threshold based on the signal level of the reception data.

8. The target object detection signal processing device of claim 7, wherein the scan-to-scan correlation processing module includes a low-pass filter that selectively passes a low frequency component with respect to the reception data corresponding to the echo signal from the target object.

9. The target object detection signal processing device of claim 8, wherein the scan-to-scan correlation processing module includes a recursive digital filter for calculating:

$$Y_{r,\theta}(n)=\alpha X_{r,\theta}(n)+(1-\alpha)Y_{r,\theta}(n-1),$$

here, $Y_{r,\theta}(n)$ is the scan-to-scan correlation data, $X_{r,\theta}(n)$ is the latest reception data, and $Y_{r,\theta}(n-1)$ is the scan-to-scan correlation data of one scan before, and a coefficient $\alpha$ is ranging $0 \leq \alpha \leq 1$.

10. The target object detection signal processing device of claim 5, further comprising a sweep memory for storing the scan-to-scan correlation data.

11. The target object detection signal processing device of claim 10, wherein the scan-to-scan correlation processing module includes a memory for storing the scan-to-scan correlation data of one scan before so as to be associated with an azimuth direction and a distance, and
wherein the scan-to-scan correlation processing module reads the new reception data from the sweep memory, reads the scan-to-scan correlation data associated with the azimuth direction and the distance of the new reception data from the memory, and performs the scan-to-scan correlation processing between the new reception data and the scan-to-scan correlation data to output the new scan-to-scan correlation data.

12. The target object detection signal processing device of claim 5, further comprising a binarizing module for binarizing the data outputted from the output selection module based on a predetermined binarizing threshold.

13. The target object detection signal processing device of claim 12, wherein the binarizing threshold is less than the selection threshold.

14. The target object detection signal processing device of claim 13, wherein the binarizing module outputs a signal indicative of existence of the target object when the output from the output selection module is greater than the binarizing threshold.

15. The target object detection signal processing device of claim 14, further comprising a tracking module for tracking the target object based on the output from the binarizing module.

16. The target object detection signal processing device of claim 13, further comprising an echo trail generation processing module for performing echo trail generation processing to indicate a trail of the target object based on the data outputted from the output selection module.

17. The target object detection signal processing device of claim 5, further comprising:
an antenna for transmitting an electromagnetic wave, receiving an echo signal from the target object, and outputting a reception signal; and
an image display module for displaying a radar image generated based on the data outputted from the output selection module.

18. The target object detection signal processing device of claim 17, further comprising:
a binarizing module for binarizing the data outputted from the output selection module based on a predetermined binarizing threshold to indicate existence of the target object; and
a tracking module for tracking the target object based on the output from the binarizing module.

19. A radar image display program, readable by a computer, comprising:
causing a computer to transmit an electromagnetic wave by an antenna and receive an echo signal;
causing a computer to perform scan-to-scan correlation processing between reception data indicative of a reception level of the echo signal and previous reception data indicative of a reception level of previously acquired echo signal to output scan-to-scan correlation data;
causing a computer to be inputted the reception data and the scan-to-scan correlation data, and selectively output either one of the reception data and the scan-to-scan correlation data based on a predetermined selection threshold; and
causing a computer to output image data for displaying a radar image based on the selectively outputted data.

20. A method of displaying a radar image, comprising:
transmitting an electromagnetic wave by an antenna and receiving an echo signal;
performing scan-to-scan correlation processing between reception data indicative of a reception level of the echo signal and previous reception data indicative of a reception level of the previously acquired echo signal to output scan-to-scan correlation data;
setting a selection threshold based on the reception data;
in response to an input of the reception data and the scan-to-scan correlation data, selectively outputting either one of the reception data and the scan-to-scan correlation data based on the selection threshold; and
displaying a radar image generated based on the selectively outputted data.

* * * * *